Patented Nov. 10, 1925.

1,561,053

UNITED STATES PATENT OFFICE.

BRUCE K. BROWN AND EMIL G. SCHMIDT, OF TERRE HAUTE, INDIANA, ASSIGNORS TO COMMERCIAL SOLVENTS CORPORATION, OF TERRE HAUTE, INDIANA, A CORPORATION OF MARYLAND.

METHOD OF AND COMPOSITION FOR CLEANING METALS.

No Drawing. Application filed January 28, 1925. Serial No. 5,371.

*To all whom it may concern:*

Be it known that we, BRUCE K. BROWN and EMIL G. SCHMIDT, both citizens of the United States, and residing at Terre Haute, in the county of Vigo and State of Indiana, have invented a certain new and useful Method of and Composition for Cleaning Metals, of which the following is a specification.

This invention relates to the cleaning and preserving of metal surfaces and has as its object the development of a new and novel method of and composition for the removal of rust from iron and steel, and the preparation of rustproof ferrous surfaces.

In the past it has been proposed to remove rust from, and to prevent further rusting of, ferrous surfaces by applying solutions of phosphoric acid and then removing the excess acid by washing the surface with water. Strong acids such as sulfuric acid and hydrochoric acid also have the property of quickly removing rust from iron surfaces, but these acids attack the iron itself and leave the metallic surface in such a chemical state that further rusting is accelerated. For this reason, phosphoric acid, and other acids which deposit insoluble iron salts on the surface treated as for example oxalic acid, are much to be preferred for rust removing purposes.

The stable insoluble iron phosphate formed on the metal surface during the employment of such a rust removing composition protects the metal surface beneath from further rusting and also acts as an excellent "primer coat" for the application of paint or lacquer.

While solutions of acids forming insoluble iron salts may be employed in removing rust and in protecting iron surfaces from further rusting, such solutions are ineffective for use on iron surfaces on which grease or oil has been deposited. The acid solutions do not "cut" or emulsify the oily coating, which acts as an effective protective surface for both rust and iron. It has therefore been proposed to use mixtures of phosphoric acid and ethyl alcohol for these purposes, the latter ingredient being employed to reduce the surface tension of the solution, to "cut" the grease and oil, and to assist in the removal of rust. Ethyl alcohol was found, however, to have several serious disadvantages when employed in rust removing compositions. Its volatility caused quick evaporation and consequent waste of material, its vapors were objectionable, and it was found to cut grease and oil imperfectly.

It was later proposed to substitute fusel oil and the higher monohydric alcohols, such as propyl, butyl, and amyl alcohol, for the ethyl alcohol formerly used in rust removing compositions. Compositions of this nature were more efficient than ethyl alcohol-acid mixtures on account of the superior grease and oil cutting action of the higher alcohols, and their less volatile nature.

It is the object of our invention to provide an improved rust removing composition and a method of employing the same, whereby the disadvantages attendant on rust removing compositions known in the prior art are obviated and greater efficiency of operation is attained.

We have discovered that mesityl oxide may be compounded with phosphoric acid, or other acids forming insoluble iron salts, to form an excellent rust removing and rust preventing composition. Mesityl oxide is a colorless liquid boiling at about 130°C. It is insoluble in water and soluble in most organic solvents. It has the following structure formula:—

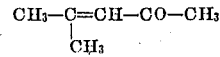

We have discovered that mixtures comprising mesityl oxide and an aqueous solution of an acid forming insoluble iron salts, as for example, phosphoric acid, form excellent rust removing and rust preventing compositions but that such mixtures are not homogeneous. We have further discovered that such mixtures may be rendered homogeneous by adding a blending agent such as acetone or alcohol.

We have found by experiment that a mixture of one part of an aqueous solution containing eighty-five per cent phosphoric acid, one part of acetone, one part mesityl oxide and one part of water produces an excellent rust removing and rust preventing composition for the treatment of iron surfaces. The mesityl oxide present retards the rate of evaporation of the mixture, acts as an oil and grease remover, and improves the surface covering power of the mixture.

While we have indicated the proportions of ingredients which we prefer to employ, it should be understood that our invention is not so limited. For example, as little as .2 parts of mesityl oxide in the mixture produces to some extent, the desirable properties above outlined.

In employing our improved composition for the removal of rust from iron surfaces and the prevention of further rusting, the composition may be applied to the surface by dipping the article to be coated in the solution, or by applying the solution with a brush or cloth. In ordinary practice the solution may be washed off or rubbed off after a few minutes of contact with the surface. In the case of badly rusted articles it is sometimes necessary to rub off the loosened rust by abrasive means.

Now, having fully described our invention, we claim the following as new and novel:—

1. The method of cleaning iron and preserving it from rusting consisting in submitting it to the action of an admixture of mesityl oxide and an acid forming insoluble iron salts and removing said admixture from the iron.

2. The method of cleaning iron and preserving it from rusting consisting in submitting it to the action of an admixture of mesityl oxide, an acid forming insoluble iron salts, acetone, and water, and removing said admixture from the iron.

3. The method of cleaning iron and preserving it from rusting consisting in submitting it to the action of an admixture of mesityl oxide, acetone, and phosphoric acid, and removing said admixture from the iron.

4. The method of cleaning iron and preserving it from rusting, consisting in submitting it to the action of an admixture of mesityl oxide, phosphoric acid, acetone, and water, and removing said admixture from the iron.

5. The method of cleaning iron and preserving it from rusting consisting in submitting it to the action of one part of mesityl oxide, one part of 85% phosphoric acid, one part of acetone, and one part of water, and removing said admixture from the iron.

6. A composition of matter for cleaning and preserving iron surfaces, comprising an admixture of mesityl oxide, an acid forming insoluble iron salts, and acetone.

7. A composition of matter for cleaning and preserving iron surfaces, comprising an admixture of mesityl oxide, acetone, and phosphoric acid.

8. A composition of matter for cleaning and preserving iron surfaces, comprising an admixture of mesityl oxide, acetone, phosphoric acid, and water.

9. A composition of matter for cleaning and preserving iron surfaces, comprising an admixture of one part mesityl oxide, one part of acetone, one part 85% phosphoric acid, and one part of water.

BRUCE K. BROWN.
EMIL G. SCHMIDT.